United States Patent [19]

Coran et al.

[11] Patent Number: 4,661,554

[45] Date of Patent: Apr. 28, 1987

[54] POLYNETWORK EPDM RUBBER

[75] Inventors: Aubert Y. Coran; Cynthia K. Endter, both of Akron, Ohio

[73] Assignee: Monsanto Company, St. Louis, Mo.

[21] Appl. No.: 814,475

[22] Filed: Dec. 30, 1985

[51] Int. Cl.$^4$ .......................... C08L 51/04; C08K 3/04
[52] U.S. Cl. ................................. 524/504; 524/511; 525/68; 525/285; 525/903; 525/919
[58] Field of Search ................. 525/285, 68, 903, 919; 524/504, 511

[56] References Cited

U.S. PATENT DOCUMENTS

| | | | |
|---|---|---|---|
| 3,287,440 | 11/1966 | Giller et al. | 260/846 |
| 4,010,223 | 3/1977 | Caywood | 260/875 |
| 4,244,843 | 1/1981 | Hashimoto et al. | 260/5 |
| 4,410,656 | 10/1983 | Coran et al. | 524/529 |

*Primary Examiner*—Theodore E. Pertilla
*Attorney, Agent, or Firm*—Gordon B. Seward

[57] ABSTRACT

Polynetwork EPDM rubber is EPDM rubber containing both ionomeric and covalent cross-links, and can be formed by treating EPDM rubber with maleic acid or anhydride or fumaric acid to attach succinic groups to the rubber, forming an ionomer thereof with a polyvalent metal oxide, hydroxide or salt, and then covalently cross-linking the rubber, for example, by sulfur vulcanization. Compositions are shown containing the polynetwork rubber in combination with oil and black, optionally in blends with high-diene hydrocarbon rubber, such as natural rubber.

12 Claims, No Drawings

POLYNETWORK EPDM RUBBER

BACKGROUND OF THE INVENTION

This invention relates to EPDM rubber, cross-linked in more than one way, and to compositions containing such rubber together with other rubbers and rubber compounding ingredients.

EPDM rubber, a terpolymer from ethylene, propylene and a minor amount of a non-conjugated diene monomer, can be cross-linked in a variety of ways. Since it contains some olefinic unsatuation, it is susceptible to sulfur-vulcanization, by using organosulfur accelerators. Phenolic resin-type curatives are also used to cross-link EPDM rubber, and organic peroxides, which decompose at elevated temperatures, are also effective cross-linkers for EPDM rubber.

Caywood, in U.S. Pat. No. 4,010,223, describes adducts of EPDM rubber, which adducts are formed by the reaction of, for example, maleic anhydride with the rubber at an elevated temperature. The use of a free radical generator is avoided so that the maleic anhydride does not cross-link the rubber, but, it is theorized that the maleic anhydride adds to the polymer chains so as to attach pendent succinic anhydride groups thereto. Subsequent reaction of the maleic anhydride-treated EPDM with metal salt "curing agents," such as zinc acetate dihydrate creates ionic linkages which are thermally labile so that the "cured" adducts are thermoplastic and can be shaped and further compounded on a warm rubber mill. Although the adducts can also be cross-linked with diamine compounds, the patent notes that this latter type of cross-linking is "permanent," in that the rubber is then no longer thermoplastic.

Giller U.S. Pat. No. 3,287,440 describes the cross-linking of EPDM rubber by the use of "phenol aldehyde resins," such as methylol phenolic resins, in the presence of a halogen donor and a heavy metal compound. The cross-links formed by this method consist of one or more resin units which connect two polymer chains; thus a network is formed.

Sulfur vulcanization of EPDM rubber forms mostly polysulfidic cross-links which connect polymer chains, as is well documented in the literature.

Cross-linking of EPDM rubber by using organic peroxides results in the formation of networks in which the polymer chains are joined by carbon atom to carbon atom linkages.

Of the cross-links for EPDM rubber discussed above, those obtained by using the metal-salt "curing agents" described by Caywood can be described as ion-cluster cross-links or ionomeric cross-links. The remaining types of cross-link can be termed "covalent cross-links."

SUMMARY OF THE INVENTION

It has now been discovered that particularly good properties can be realized in polynetwork EPDM rubber compositions. These compositions are based on polynetwork EPDM rubber, which contains both ionomeric and covalent cross-links. Preferably, the ionomeric cross-links are based on the neutralization of succinic groups, pendent to the EPDM rubber molecules, by metal oxides, metal hydroxides or metal salts of weak acids. In a preferred mode, polynetwork EPDM rubber can be made by treating EPDM rubber with maleic acid or anhydride or fumaric acid to form an adduct, treating the adduct with a polyvalent metal salt, hydroxide or oxide to form an ionomer, and cross-linking the ionomer with a vulcanizing agent so as to introduce covalent cross-links into the EPDM rubber. The above steps can be performed in any order, but preferably are done in the sequence named.

The compositions of the invention have particularly improved properties, which are believed to result from the presence of more than one type of network structure, since both ionomeric cross-links and covalent cross-links are featured. The ionomeric cross-links can be produced in the same manner as those described in U.S. Pat. No. 4,010,223, mentioned above. There, EPDM rubber is treated with maleic acid, maleic anhydride or fumaric acid in such a manner as to graft succinic acid or anhydride groups onto the EPDM rubber chain. Caywood advises avoiding the presence of a free-radical generator, so as to avoid cross-linking the EPDM rubber in this step, and specifies that his adducts contain less than 5% gel.

Alternatively, however, the adducts can contain a moderate level of cross-links which are formed in the step of treatment with maleic acid or anhydride or fumaric acid, and a free-radical generator can be employed in this step, so that the treatment can be accomplished in less time or at lower temperatures or both. The presence of more than 10% gel in the adducts is not found to be detrimental, although adducts containing less than 10% gel are preferred, with 5% or less more preferred. It should be noted, however, that there should not be a sufficient amount of cross-linking to prevent the processing of the modified rubber, for example, on a roll mill or in an internal mixer.

Examples of EPDM rubber which are satisfactory in the compositions of the invention include the products from the polymerization of mixtures of monomers, such a mixture comprising two alpha monoolefins, usually ethylene and propylene and a lesser quantity of non-conjugated diene.

Suitable alpha monoolefins are illustrated by the formula $CH_2\!=\!CHR$ in which R is hydrogen or alkyl of 1–12 carbon atoms, examples of which include ethylene, propylene, 1-butene, 1-pentene, 1-hexene, 2-methyl-1-propene, 3-methyl-1-pentene, 4-methyl-1pentene, 3,3-dimethyl-1-butene, 2,4,4-trimethyl-1-pentene, 5-methyl-1-hexene, 4-ethyl-1-hexene and others. Satisfactory non-conjugated dienes include straight chain dienes such as 1,4-hexadiene, cyclic dienes such as cyclooctadiene and bridged cyclic dienes such as ethylidenenorbornene and dicyclopentadiene.

In a preferred method for forming the adducts which are intermediates for the compositions of the invention, EPDM rubber, as defined above, is first treated with maleic acid or anhydride or fumaric acid at an elevated temperature. The procedures set forth by Caywood in U.S. Pat. No. 4,010,223 are effective for producing the adducts, and the disclosure of this patent is herein incorporated by reference. If, however, it is desired to use a free-radical generator, in order to speed the production of adduct, this may be done. Selection of the type and amount of free radical generator should be done with regard to the desired treatment temperature, the degree of cross-linking which is desired or which can be tolerated, and the possible side reactions of the free-radical generator or the residue thereof. Examples of free-radical generators which can be used include organic peroxides, such as dicumylperoxide, and benzothiazyl disulfide. Of these two, the benzothiazyl disulfide is preferred, since there is a minimum of cross-link formation with its use. Note Coran et al U.S. Pat. No. 4,410,656.

The treatment of the EPDM rubber to produce the adduct is preferably done in bulk, although it can be done in solution in a solvent for the rubber. Bulk treatment is usually accomplished by admixing to the rubber maleic acid or anhydride (or fumaric acid) and subjecting the mixture to elevated temperatures, typically in excess of 200° C., although lower temperatures, around 100° C., can be used if a free-radical generator is employed. Depending on the selection of ingredients and the temperature, the treatment can be performed for from several minutes up to two hours or more. The mixture can be stirred or masticated during the treatment or, alternatively, the mixture can be statically heated, as in an oven, autoclave or a heated press.

After the adduct is formed, it is then treated with a polyvalent metal salt, hydroxide or oxide to form an ionomer. Treatment involves merely admixture of sufficient salt, hydroxide or oxide to form ionic bonds or ion clusters with the pendent succinic groups, usually with an excess of the salt, hydroxide or oxide. Even if the succinic groups are partially esterified to form half-esters or partially amine-neutralized to form amic acids at this point, ion cluster can be formed. If an oxide is used, a carboxylic acid such as stearic acid may advantageously be present, and will act to accelerate the formation of the ionomer. Water is an effective accelerator, also, as are paraphenylenediamines such as N-1,3-dimethylbutyl-N'-phenyl-paraphenylenediamine.

Covalent cross-linking of the ionomer is accomplished by admixture of a cross-linker which can be sulfur or a sulfur donor (with or without one or more organosulfur accelerators), a methylol phenolic resin or an organic peroxide, with subsequent heating at cross-linking temperatures for sufficient time to form the covalent cross-links. The amounts and types of cross-linking agents used will be determined by the properties desired in the final product.

Other rubbery polymers can also be present in the compositions of the invention, and the compositions can contain from 10 percent up to about 90 percent, based on the total rubber content of the composition, of one or more high-diene hydrocarbon rubbers, such as natural rubber, synthetic polyisoprene, polybutadiene and SBR rubber. In the final form of these compositions, the other rubber will be covalently cross-linked as well.

The compositions can contain other rubber compounding ingredients, also, such as fillers, reinforcing agents, softeners, curatives and antidegradants and the like. From 0 to 200 parts of a filler such as carbon black by weight, based on the EPDM rubber (or on the total rubber) can be present, and from 0 to 200 parts of processing oil by weight can also be present.

Since the adducts and the ionomers can be relatively tough and viscous, the presence of significant amounts of oil can be beneficial, to permit them to be mixed and processed in internal mixers, mills, extruders and calenders. The compositions of the invention show excellent physical properties even when relatively large amounts of oil are incorporated therein.

EXAMPLE I

In order to investigate the properties of the polynetwork rubber of the invention, a series of experimental rubber mixtures was prepared and tested according to the following description, in which all parts are by weight unless otherwise noted.

For convenience, a number of materials are expressed in abbreviated form, as follows:

| Abbreviated Designation | Material |
|---|---|
| EPDM | Terpolymer of ethylene, propylene and ethylidene-norbornene sold by Copolymer Corp. under the trademark "Epsyn 70A" |
| Black | N 326 Carbon Black |
| Oil | Extender oil sold by Sun Oil Co. under the trademark "Sunpar 2220" |
| Accelerator | N—(t-butyl)-2-benzothiazolyl sulfenamide |

First, modified EPDM rubber (MEPDM) is prepared by mixing the following ingredients in a BR Banbury mixer: 950 g EPDM, 19 g maleic anhydride and 1.9 g benzothiazyl disulfide (MBTS). The ingredients are mixed at high speed until the indicated stock temperature is 232°-260° C. Mixing is then continued at the appropriate speed to maintain the desired temperature range, for a period of 5 minutes. The stock temperature is 232° C. at dump.

Vulcanizable stocks are prepared to give the compositions described in Table I. In each stock, EPDM and MEPDM are mixed with black and oil for about 2.5 minutes in a small internal mixer (c. 60 ml) at a speed of 80 r.p.m. with cam-type rotors at a stock temperature of about 120° C., then the zinc oxide and stearic acid are added and mixing is continued for about ½ minute. In stocks 3, 6 and 9, ionomer is formed at this point by adding an excess of water (about 2 grams per hundred of rubber) to act as an accelerator. The mixture is then masticated an additional 5 minutes at about 120° C. Each batch is blended on a roll mill, where the sulfur and accelerator are added. The batch weight in each case is about 65 g.

TABLE I

| | Stock No. | | | | | | | | |
|---|---|---|---|---|---|---|---|---|---|
| | 1 | 2 | 3 | 4 | 5 | 6 | 7 | 8 | 9 |
| EPDM | 100 | — | — | 100 | — | — | 100 | — | — |
| MEPDM | — | 100 | 100 | — | 100 | 100 | — | 100 | 100 |
| Black | 50 | 50 | 50 | 75 | 75 | 75 | 100 | 100 | 100 |
| Oil | 10 | 10 | 10 | 60 | 60 | 60 | 110 | 110 | 110 |
| Zinc Oxide | 5.0 | 5.0 | 5.0 | 5.0 | 5.0 | 5.0 | 5.0 | 5.0 | 5.0 |
| Stearic Acid | 2.0 | 2.0 | 2.0 | 2.0 | 2.0 | 2.0 | 2.0 | 2.0 | 2.0 |
| Sulfur | 2.0 | 2.0 | 2.0 | 2.0 | 2.0 | 2.0 | 2.0 | 2.0 | 2.0 |
| Accelerator | 0.5 | 0.5 | 0.5 | 0.5 | 0.5 | 0.5 | 0.5 | 0.5 | 0.5 |
| Vulcanizates Properties | | | | | | | | | |
| Hardness, Shore A | 65 | 68 | 69 | 53 | 60 | 56 | 45 | 50 | 47 |
| Ult. Ten., MPa | 16.3 | 24.4 | 20.9 | 15.5 | 16.9 | 17.6 | 13.2 | 15.9 | 16.8 |
| Modulus @ 300%, MPa | 10.7 | — | 19.7 | 6.9 | 13.7 | 13.5 | 4.5 | 8.5 | 8.6 |

TABLE I-continued

| | Stock No. | | | | | | | | |
|---|---|---|---|---|---|---|---|---|---|
| | 1 | 2 | 3 | 4 | 5 | 6 | 7 | 8 | 9 |
| Ult. Elong., % | 389 | 275 | 305 | 470 | 322 | 360 | 553 | 470 | 490 |
| Torsional Hyster., % | — | — | — | 13.3 | 8.0 | 8.0 | 13.5 | 8.6 | 8.6 |

The stocks in Table I are identified on the basis of 100 weight parts of rubber. Stocks 1, 4 and 7 are unmodified EPDM controls with increasing levels of oil and black. Stocks 2, 5 and 8 are modified EPDM rubber with increasing levels of oil and black. In stocks 3, 6 and 9 the MEPDM is "ionomerized" before vulcanization by sulfur (in the mold).

Based on rheometer results the stocks were cured at 153° C. to optimum levels, and the stress-strain and hardness properties of the vulcanizates were measured, according to the procedures of ASTM D-412. Torsional hysteresis was determined by the method of Mooney and Gerke, *Rubber Chem. Technol.* 14 (1941). Torsional hysteresis values were not obtained on stocks 1, 2 and 3.

Test results on the fully vulcanized stocks indicate that the compositions containing polynetwork EPDM rubber (stocks 2, 3, 5, 6, 8, and 9) have higher strength and lower hysteresis than the control samples. With increasing levels of oil and black, the advantages of the polynetwork rubber are more pronounced, and the stocks in which the ionomer was formed in a separate step (stocks 3, 6 and 9) show the most improvement in properties.

It is also significant that stock 9, although containing high levels of both oil and black, is equivalent or superior in all respects to stock 1.

Instead of succinic groups, pendent to the EPDM molecules, other groups can be used to form ion-cluster cross-links. These comprise groups such as N-carboxyalkyl- or N-carboxyary-substituted succinamic acid or succinimide groups.

Although the invention has been illustrated by typical examples, it is not limited thereto. Changes and modifications of the examples of the invention herein chosen for purposes of disclosure can be made which do not constitute departure from the spirit and scope of the invention.

We claim:

1. Polynetwork rubber which rubber is a product of the polymerization of a mixture of ethylene, propylene and a lesser quantity of non-conjugated diene, said rubber containing both ionomeric cross-links and cross-links formed by the reaction of said rubber with sulfur or a sulfur donor, a methylol phenolic resin or an organic peroxide.

2. The polynetwork rubber of claim 1 in which the ionomeric cross-links are based on the neutralization of succinic groups pendent to the rubber molecules, by metal oxide, metal hydroxide, or salt of a weak acid.

3. Polynetwork rubber which rubber is a product of the polymerization of a mixture of ethylene, propylene and a lesser quantity of non-conjugated diene formed by
   (A) treating the polymerization product with maleic acid or anhydride or fumaric acid to form an adduct,
   (B) treating the adduct thus formed with a polyvalent metal salt, hydroxide or oxide to form an ionomer, and
   (C) cross-linking the ionomer with a vulcanizing agent selected from sulfur or sulfur donors, methylol phenolic resins and organic peroxides so as to introduce covalent cross-links therein, in which the steps can be sequential or simultaneous.

4. The polynetwork rubber of claim 3, wherein
   (A) the polymerization product is treated by mastication with maleic anhydride to form the adduct,
   (B) the adduct is treated with zinc oxide to form the ionomer and
   (C) the ionomer is cross-linked with a vulcanizing agent selected from sulfur, sulfur donors, methylol phenolic resin and an organic peroxide, wherein the non-conjugated diene is selected from 1,4-hexadiene, cyclooctadiene, ethylidenenorbornene and dicyclopentadiene.

5. The polynetwork rubber of claim 4, wherein a free-radical generator is present during step (A).

6. The rubber of claim 5 wherein the free-radical generator is benzothiazyl disulfide.

7. A composition comprising the polynetwork rubber of claim 1, and from 5 to 500 parts by weight, based on the rubber, of a high-diene hydrocarbon rubber.

8. A composition comprising the polynetwork rubber of claim 1, and from 0 to 200 parts by weight, based on the rubber, of carbon black.

9. A composition comprising the polynetwork rubber of claim 1, and from 0 to 200 parts by weight, based on the rubber, of a rubber processing oil.

10. A composition comprising the polynetwork rubber of claim 2, and from 0 to 200 parts by weight each, based on the rubber, of carbon black and a rubber processing oil.

11. A composition according to claim 7 and from 10 to 200 parts by weight each, based on the total weight of the polynetwork rubber plus the high-diene hydrocarbon rubber, of carbon black and a rubber processing oil.

12. The polynetwork rubber of claim 1, wherein the ionomeric cross-links comprise N-carboxyalkyl- or N-carboxylaryl-substituted succinamic acid or succinimide groups.

* * * * *